(12) United States Patent
Metev et al.

(10) Patent No.: US 11,935,114 B2
(45) Date of Patent: Mar. 19, 2024

(54) RENTAL PROPERTY MONITORING AND PROTECTION SYSTEM AND METHOD

(71) Applicants: Metiu Metev, Philadelphia, PA (US); Stanislav Georgiev, Slatina (BG)

(72) Inventors: Metiu Metev, Philadelphia, PA (US); Stanislav Georgiev, Slatina (BG)

(*) Notice: Subject to any disclaimer, the term of this patent is extended or adjusted under 35 U.S.C. 154(b) by 638 days.

(21) Appl. No.: 17/134,701

(22) Filed: Dec. 28, 2020

(65) Prior Publication Data
US 2021/0201391 A1 Jul. 1, 2021

Related U.S. Application Data

(60) Provisional application No. 62/954,084, filed on Dec. 27, 2019.

(51) Int. Cl.
*G06Q 30/0645* (2023.01)
*G06N 20/00* (2019.01)
*G06V 20/40* (2022.01)
*G06V 20/52* (2022.01)
*G06V 40/10* (2022.01)
*G06V 40/20* (2022.01)
(Continued)

(52) U.S. Cl.
CPC ......... *G06Q 30/0645* (2013.01); *G06N 20/00* (2019.01); *G06Q 50/163* (2013.01); *G06V 20/40* (2022.01); *G06V 20/52* (2022.01); *G06V 40/10* (2022.01); *G06V 40/20* (2022.01); *G08B 21/182* (2013.01); *G10L 25/51* (2013.01)

(58) Field of Classification Search
USPC ........................................................ 705/307
See application file for complete search history.

(56) References Cited

U.S. PATENT DOCUMENTS

| | | | |
|---|---|---|---|
| 11,055,797 B1* | 7/2021 | Carone | G06Q 50/163 |
| 11,645,706 B1* | 5/2023 | Day | G06V 20/10 |
| | | | 705/307 |
| 2021/0150380 A1* | 5/2021 | Verteletskyi | G06F 16/906 |

FOREIGN PATENT DOCUMENTS

WO WO-2021094766 A1 * 5/2021 ........... G06F 16/906

OTHER PUBLICATIONS

Conway, Jennifer, Artificial intelligence and machine learning : current applications in real estate, Massachusetts Institute of Technology, Sep. 2018, found at http://hdl.handle.net/1721.1/120609 (Year: 2018).*

* cited by examiner

*Primary Examiner* — Michael Young
(74) *Attorney, Agent, or Firm* — Daniel M. Cohn; Howard M. Cohn

(57) ABSTRACT

Disclosed embodiments provide systems and methods for hotels and rental property monitoring and protection. Cameras are oriented in non-private areas near entrances and exits of a property to be monitored. The cameras supply video feeds to a multi-layer analysis system powered by machine learning. The analysis system utilizes machine learning to perform identification of objects including people, animals, and/or other objects, identify moving track and patterns and recognize various behaviors based. Entrances and exits of rental properties are monitored to assess a current occupancy and guest and team behavior. In response to detecting a current occupancy exceeding a specific threshold or any other breach in the house rules and policies, disclosed embodiments can perform various actions including, but not limited to, notifying guests, notifying property managers, and/or other actions as appropriate.

18 Claims, 14 Drawing Sheets

(51) Int. Cl.
*G08B 21/18* (2006.01)
*G10L 25/51* (2013.01)

RENTAL PROPERTY MONITORING AND PROTECTION SYSTEM AND METHOD

CROSS REFERENCE TO RELATED APPLICATIONS

This application claims the benefit of U.S. Provisional Patent Application No. 62/954,084 filed on Dec. 27, 2019, which is incorporated in its entirety by reference herein.

FIELD

The present invention relates generally to property monitoring and security, and more particularly, to hotels and rental property monitoring and protection systems and methods.

BACKGROUND

Rental of real estate properties such as condominiums, townhomes, and single-family homes and hotels comprise a substantial piece of the overall economy. In particular, short term rentals for leisure and business travel are a sizeable segment of the overall real estate property rental market. Numerous web-enabled organizations, such as VRBO, Airbnb, Expedia, Kayak, Booking.com, Marriott Bonvoy and the like, facilitate listing and renting of short-term rental (STR) properties. This benefits renters by making more properties available for rent, hence providing more choice when making travel plans. Similarly, it gives property owners the opportunity to earn better returns from their real estate.

SUMMARY

In one embodiment, there is provides a computer-implemented method for monitoring and protecting a rental property, comprising: acquiring video data of an entrance for the rental property from a digital camera; establishing a boundary within a field of view of the digital camera, wherein the boundary is associated with the entrance; using a machine learning system to identify an object of interest traversing the boundary; in response to identifying the object of interest traversing the boundary, updating an occupancy count for the rental property; and sending an occupancy message to a remote computing device, wherein the occupancy message includes the updated occupancy count.

In another embodiment, there is provided an electronic computation device comprising: a processor; a memory coupled to the processor, the memory containing instructions, that when executed by the processor, cause the electronic computation device to: acquire video data of an entrance for the rental property from a digital camera; use a machine learning system to establish a boundary within a field of view of the digital camera, wherein the boundary is associated with the entrance; use the machine learning system to identify an object of interest traversing the boundary; in response to identifying the person traversing the boundary, updating an occupancy count for the rental property; and send an occupancy message to a remote computing device, wherein the occupancy message includes the updated occupancy count.

In yet another embodiment, there is provided a computer program product for an electronic computation device comprising a computer readable storage medium having program instructions embodied therewith, the program instructions executable by a processor to cause the electronic computation device to: acquire video data of an entrance for the rental property from a digital camera; use a machine learning system to establish a boundary within a field of view of the digital camera, wherein the boundary is associated with the entrance; use the machine learning system to identify an object of interest traversing the boundary; in response to identifying the person traversing the boundary, updating an occupancy count for the rental property; and send an occupancy message to a remote computing device, wherein the occupancy message includes the updated occupancy count.

BRIEF DESCRIPTION OF THE DRAWINGS

The structure, operation, and advantages of the present invention will become further apparent upon consideration of the following description taken in conjunction with the accompanying figures (FIGs). The figures are intended to be illustrative, not limiting.

DETAILED DESCRIPTION

Figure 1:
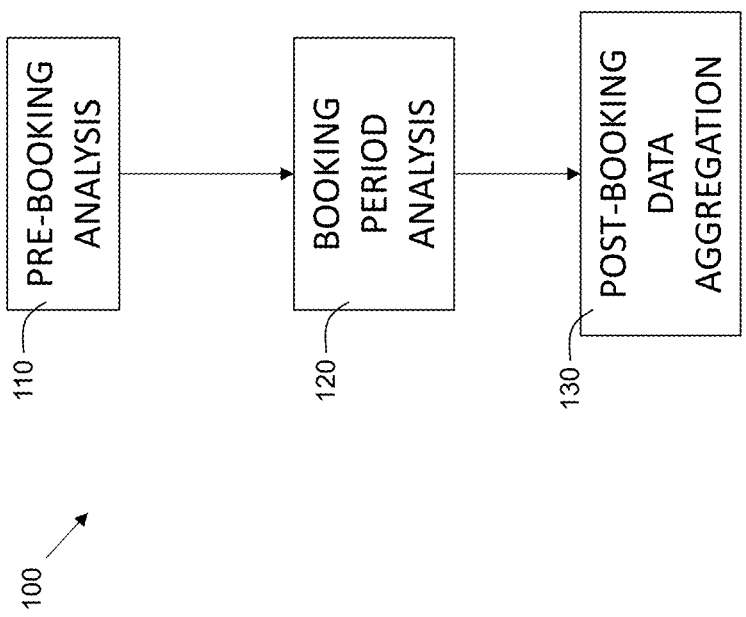
FIG. 1 is a flowchart showing phases of embodiments of the present invention.

The sustained growth of short-term property rental has given rise to concerns for hosts of individual units and hotel owners and managers with regards to protection of their properties. Careless and/or malicious guests often violate property rules. Examples of such instances can include having more occupants than permitted (e.g., throwing a large party in a rental property), excessive noise (e.g., from a large party or loud music playing), prohibited items (e.g., pets or other animals) or malicious behavior (e.g., public nudity or aggression). It is therefore desirable to have improvements for protecting rental properties from the aforementioned situations. Such protections are needed both to facilitate operations in existing rentals and to enable the continuous expansion of the sector since its viability has been put in question mainly because of the factors mentioned above.

Alongside that, hosts and property managers struggle to reduce costs and control operations in hotels and rental properties more efficiently. The commonly accepted method requires physical workforce that's tasked with following team members who execute routine tasks and later reporting to management. This approach is expensive, inefficient and does not build a holistic understanding of the business and it is therefore desired that improvements for real-time reporting of operations are built and introduced to the market.

Disclosed embodiments provide systems and methods for hotels and rental property monitoring and protection. Cameras are oriented in non-private areas near entrances and exits of a property to be monitored. The cameras supply video feeds to a multi-layer analysis system powered by machine learning. The analysis system utilizes machine learning to perform identification of objects including people, animals, and/or other objects. Disclosed embodiments monitor entrances and exits of rental properties to assess current occupancy. In response to detecting a current occupancy exceeding a predetermined threshold, disclosed embodiments can perform various actions including, but not limited to, notifying guests, notifying property managers, and/or other actions as appropriate.

Another aspect of disclosed embodiments is the ability to provide a holistic understanding of all important operating aspects of managing a rental property (e.g. when did the guest check in or out, what did they bring, were they happy when they arrived, did they arrive early or late, did they exhibit any malicious behavior outside of the rental unit, what time did the cleaner arrive and how much time did the cleaner spend preparing the unit for the guest, when did maintenance arrive and how did they approach the guest at the door, is the unit guest ready, how many people (team or guests) are inside the unit now, etc.).

In addition to protection of rental properties via data from cameras and other sensors, disclosed embodiments utilize information about prospective renters and booking circumstances to analyze a prospective renter perform action sequences which can include approving a prospective renter, denying a prospective renter, and/or suggesting alternative properties to the prospective renter. In this way, disclosed embodiments provide a comprehensive rental property monitoring and protection system that can increase security, provide critical operational insights, reduce costs due to damage, provide an enhanced experience for renters, and increased peace of mind for hosts, knowing that their property is being protected.

FIG. 1 is a flowchart 100 showing phases of embodiments of the present invention, indicating three phases of property protection. At 110, phase 1 is shown, of pre-booking analysis. This can include examining previous booking history of a prospective renter (if available), as well as other rental criteria. At 120, phase 2 is shown, of booking period analysis. During booking period analysis, the premises are monitored via one or more cameras, audio level sensors, and/or other environmental sensors, including, but not limited to, temperature sensors, light sensors, smoke sensors and/or humidity sensors. At 130, phase 3 is shown, of post-reservation data aggregation. Once a person has completed a stay at a property, an account and/or renter profile is updated with information including any incidents such as complaints of loud noise, property damage, rule violations, and the like. The renter profile and/or booking history is used as part of the criteria for pre-booking analysis. The account/renter profile also may include a mobile device (e.g., telephone) associated with the guest, address, payment info, reviews, reputation and other personal information.

Figure 2:
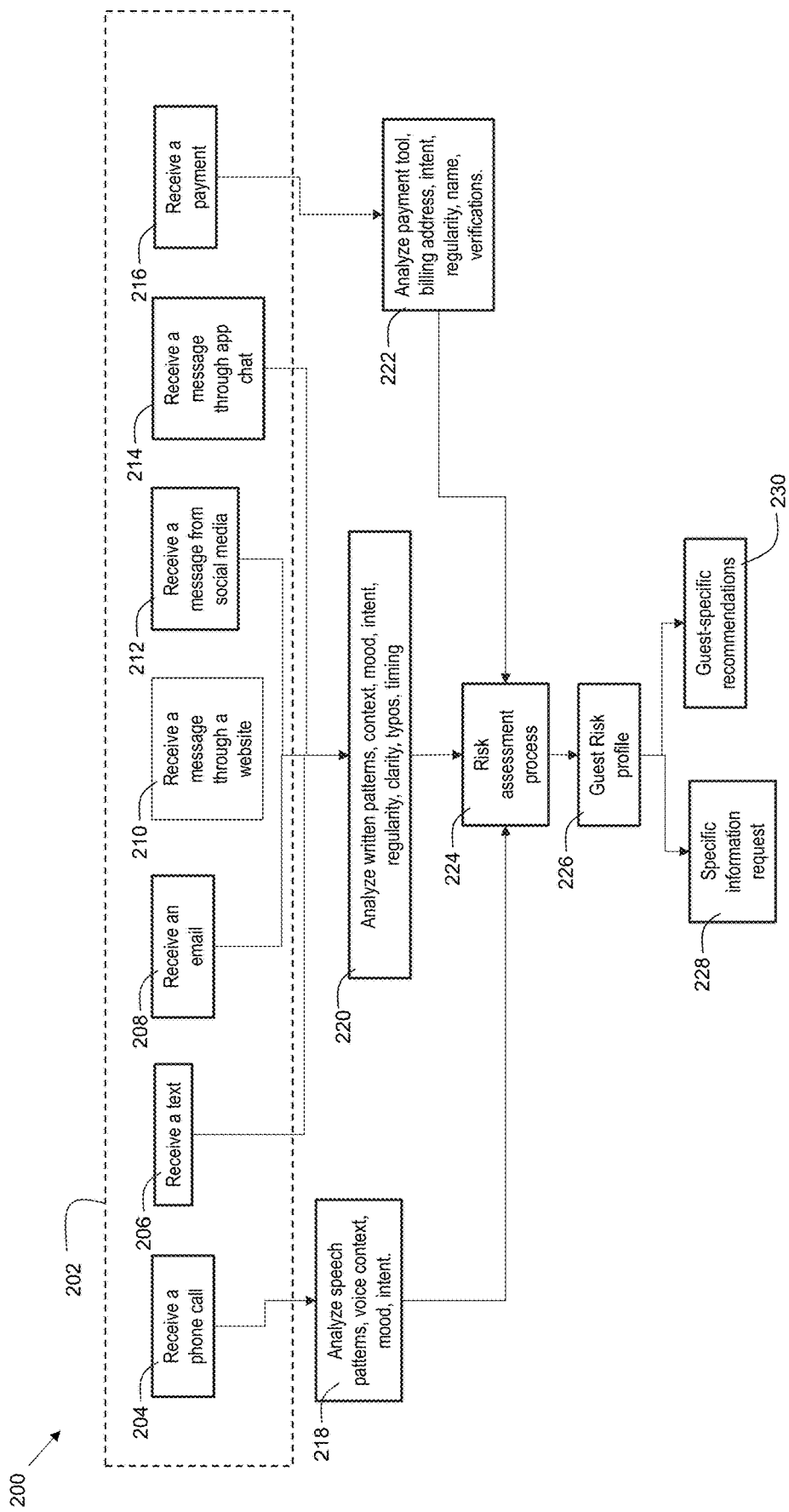
FIG. 2 is a flowchart indicating details of a pre-booking analysis.

FIG. 2 is a flowchart 200 indicating details of a pre-booking analysis such as indicated at 110 of FIG. 1. At 202, a reservation operation is received. The reservation operation 202 can be received via a phone call 204, via written communication such as text message 206, e-mail 208, website message 210, social media message 212, and/or app chat message 214.

For verbal communication, the flow continues to 218, where speech is analyzed to infer voice, context, mood, and/or intent. In embodiments, a natural language processing system may be used to perform speech analysis. Embodiments may include one or more electronic computing devices configured to perform computerized natural language processing tasks and functions. These tasks can include, but are not limited to, entity detection, disambiguation, context extraction, phoneme analysis, speech-to-text processing, and/or foreign language translation.

For written communication, the flow continues to 220, where written patterns are analyzed for various attributes and criteria, including context, mood, intent, regularity, clarity, typographical errors, and timing. Embodiments may include one or more electronic computing devices configured to perform computerized natural language processing tasks and functions. These tasks can include entity detection, disambiguation, context extraction, indexing, concordance, stop word processing, bigram processing, dispersion analysis, lexical richness analysis (ratio of distinct words to total words), disambiguation, part-of-speech analysis, and/or anaphora resolution (the process of identifying what a pronoun or noun phrase refers to). The natural language processing (NLP) system may further assess written communication for truthfulness, accuracy, and/or other attributes utilizing machine learning techniques.

At 224, a risk assessment algorithm is used to determine the risk profile 226 of the guest. In embodiments, a risk score is computed based on information in the risk profile 226 based on a mathematical formula. In response to a risk score exceeding a predetermined value, a specific action may be taken such as a request for additional information from the guest at 228, a reservation denial, and/or specific guest-tailored recommendations 230.

In one embodiment, a risk score S is computed by:

$$S = K1(F(d)) + K2(F(h)) + K3(F(c)) K4(F(a)) + K5(F(n)) + K6(F(w)) + K7(F(s) + K8(F(\text{alg})), \text{ where:}$$

F(d) is a function of distance from tenant's permanent residence to the rental property location;

F(h) is a function of renter history; and

F(c) is a function of reservation cost.

F(a) is a function of renter age group

F(n) is a function of the number of guests confirmed on the reservation

F(w) is a function of the day of the week/holiday for which the reservation is confirmed F(s) is a function of the size of the property and the max number of guests it can host F(alg) is a function built by a machine learning algorithm that evaluates various criteria K1, K2, through Kn are constants used for fine-tuning the formula.

In embodiments, a higher score S indicates a higher risk. In embodiments, F(d) varies inversely to the value d. Thus, when a renter attempts to rent a property that is very close to his/her permanent residence, F(d) has a high value, elevating the score S. In embodiments, F(h) may be a function of a number of previous incidents and optionally, the severity of each incident. A higher number of incidents and higher severities of incidents increases the value of F(h) which also increases the risk score S. As an example, a complaint of loud noises from a renter may be deemed a minor incident having a value of one. In contrast, causing property damage at a property location may be deemed a major incident having a value of ten. In some embodiments, over time, older incidents may be deleted. Thus, over time, a renter can improve their booking history with a series of incident-free reservations. In embodiments, F(c) may vary with reservation cost. As reservation cost increases, the value of F(c) increases, contributing to the overall risk score S. The aforementioned formula is exemplary, and other formulas utilizing linear and/or non-linear relationships may be used instead of, or in addition to, the aforementioned formula. In some embodiments, the scores may be generated by a machine learning system that has been trained using supervised and/or unsupervised learning techniques.

Some examples of the information requested at 228 may be predicated on the booking situation data, such as the type of property, the number of guests, the distance between the rental property and the home address of the tenant, as examples.

Below is an example of a sample information request generated at 228 for a situation when the home address of the tenant is in the same vicinity (town, county, etc.) as the rental property (residence):

Dear First_name, thank you for your interest in our property. We see that you live in Rental_city—would you mind elaborating on your plans just so we make sure that our unit is a good fit for you? Please note that we do not allow events or gatherings and have a strict no-additional-guests policy.

This is because often, people attempt to host large parties at nearby rental properties instead of at their own residence. Additional questioning such as above can serve to provide notice to the tenant about the prohibition of such activities.

Below is an example of a sample information request generated at 228 for a situation when the capacity of the rental property is much larger than the number of reported guests. As an example, a party of two attempting to book a large mansion that sleeps 22 people may receive a message such as below:

Dear First_name, thank you for your interest in our property. Your reservation request is for 1 guest only—do you expect any guests or visitors during your stay and would you mind elaborating on your plans just so we make sure that our unit is a good fit for you? Please note that we do not allow events or gatherings and have a strict no-additional-guests policy.

This is because often, people attempt to host large parties at large rental properties. Additional questioning such as above can serve to provide notice to the tenant about the prohibition of such activities.

Thus, embodiments can include performing a prebooking information request in response to a booking criterion. In embodiments, the booking criterion is the distance from a tenant's permanent home to the rental property. If this distance is below a predetermined threshold, a sample information request may be sent. In embodiments, the booking criterion is the difference between the maximum occupancy of a rental property and the number of guests attempting to book the rental property. If this number is above a predetermined threshold, a sample information request may be sent.

Figure 3:
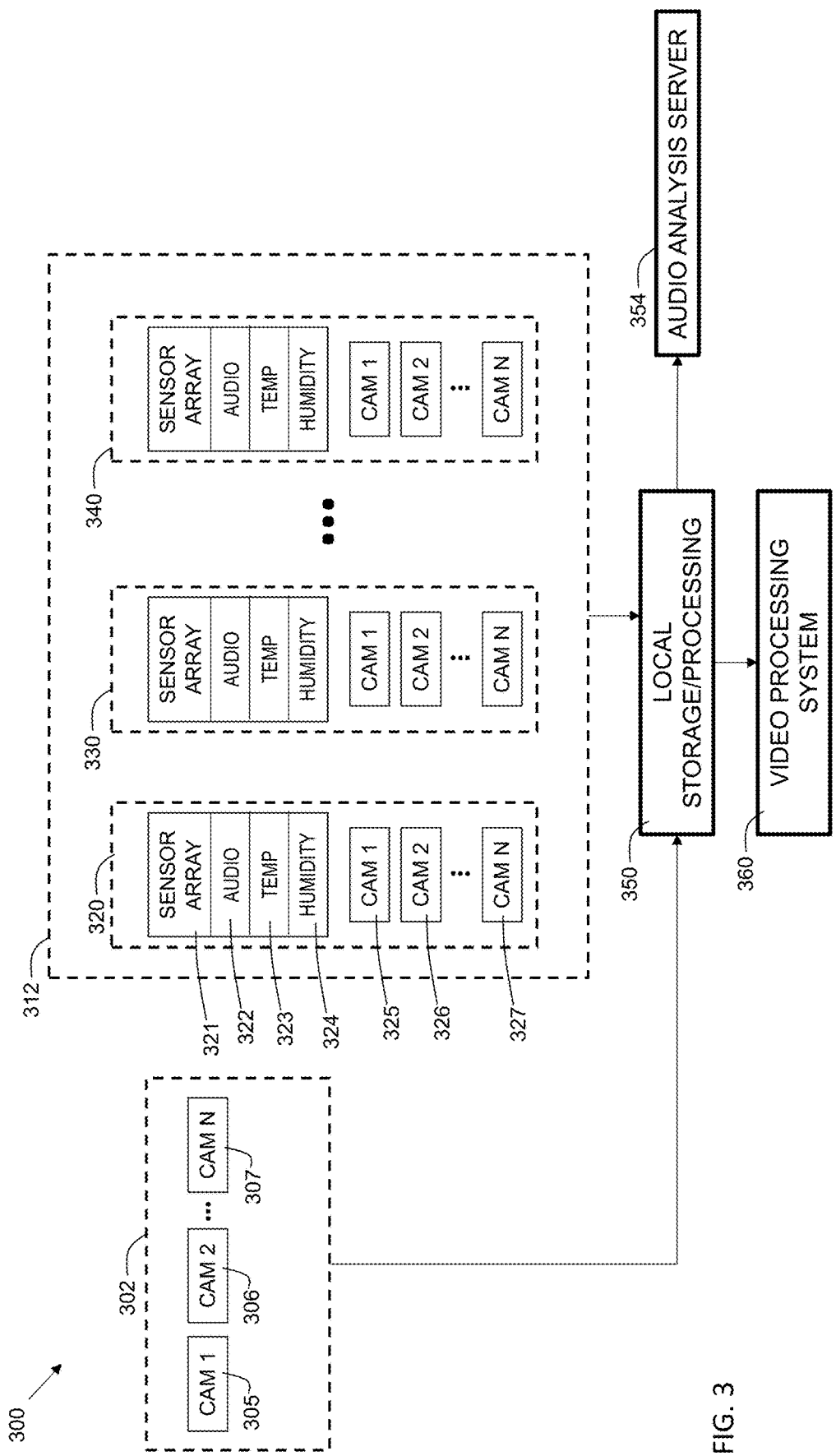
FIG. 3 is a block diagram indicating components for booking period analysis.

FIG. 3 is a block diagram 300 indicating components for booking period analysis. Diagram 300 includes common area 302. Embodiments may be used in multiple dwelling units (MDUs). An MDU may include a building with multiple condominiums, apartments, hotel rooms or other dwellings with individual entrances for residences. The common area 302 can include parking lots, main entrances and exits, and other common areas. Multiple cameras, indicated as 305, 306, and 307, may be installed within the common area 302.

In embodiments, the cameras within FIG. 3 may be web-enabled cameras that can transmit compressed video data via protocols such as HTTP, RTP, RTSP, UDP, and/or other suitable networking protocols. The cameras may include visible light cameras and/or infrared cameras for improved nighttime surveillance and/or thermal imaging camera. The cameras may have a vary in terms of field of view. Some cameras may be wide angle cameras, whereas others may have a narrow field of view, as necessary to surveil a given location.

Block diagram 300 includes a residence section 312. The residence section 312 may include one or more private residences. In FIG. 3, three residences (320, 330, and 340) are shown. In practice, there may be more or fewer residences than depicted in FIG. 3. In addition to common areas, cameras may be deployed near entrances to each unit. Referring to residence 320, multiple cameras (325, 326, and 327) are shown. In practice, there may be more or fewer cameras than depicted in FIG. 3. In embodiments, cameras may be placed at entrance/exit points, such as front doors, back doors, side doors, etc.

Referring again to residence 320, each residence may further include a sensor array 321. In embodiments, the sensor array 321 includes an audio sensor 322, a temperature sensor 323, a smoke sensor (X), and/or a humidity sensor 324. In embodiments, the audio sensor is a sound level sensor. In embodiments, the audio sensor is designed to detect a sound level, without passing actual audio data that can later be distinguished as human speech. Thus, the audio sensor does not record speech. In this way, privacy issues are alleviated as the audio sensor does not pick up spoken speech, but rather detects a sound level in the interior of the residence that is monitored to ascertain when excessive noise may be present in a residence. The other residences 330 and 340 may be similarly equipped as residence 320 in terms of cameras and the sensor array.

The video information and data from the sensor array is sent to either a local storage/processing device 350 or to a cloud storage device. In embodiments, the storage/processing device may be a server established at or near the MDU or a server in the cloud. On most occasions both a local storage device and a cloud storage device is used while both devices communicate and exchange data between each other. Storage, and some processing of the video and/or sensor data may be performed on the local server. Data from the audio sensors is sent to an audio analysis server 354 for determination if a sound level exceeds a predetermined threshold. Video data from cameras is sent to video processing system 360 for further analysis.

Figure 4:
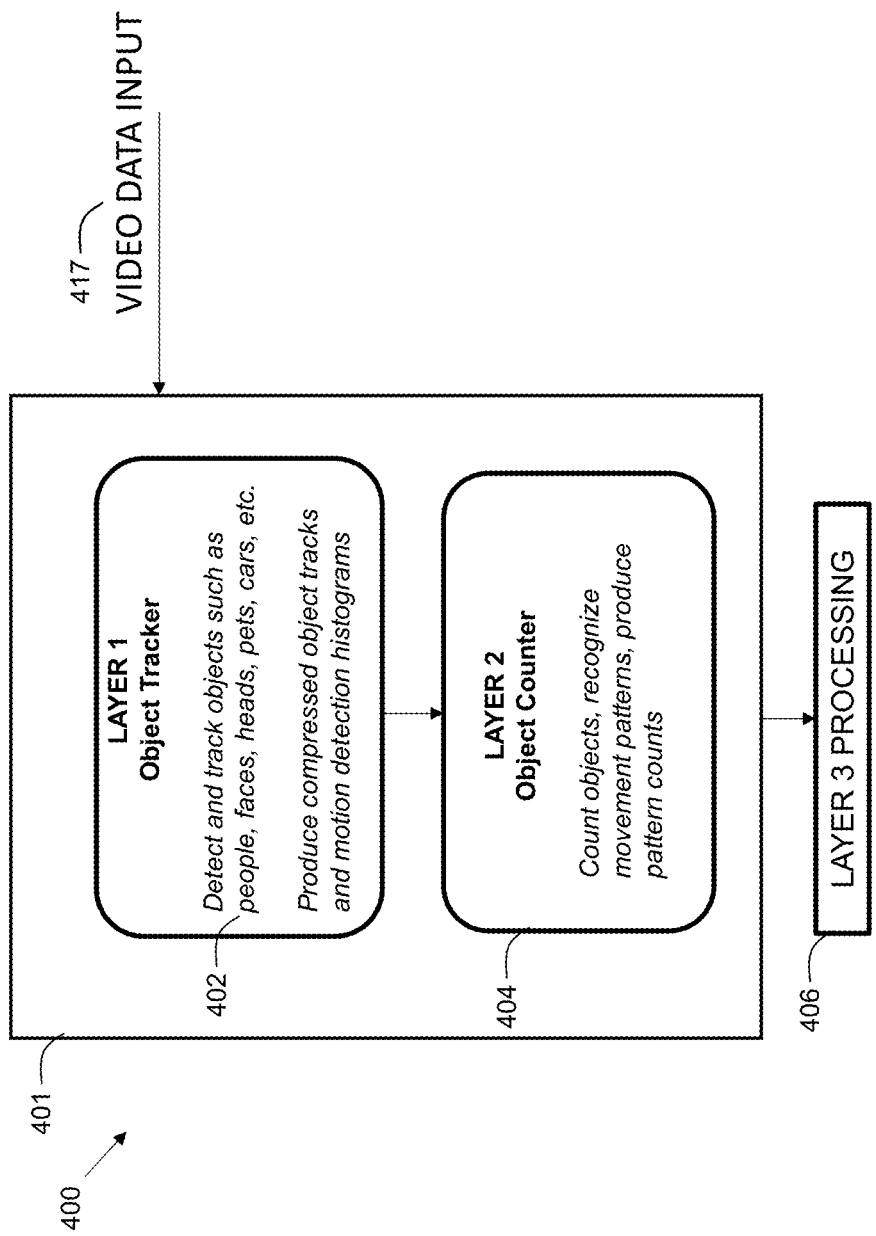
FIG. 4 is a block diagram indicating details of layer 1 and layer 2 video analysis.

FIG. 4 is a block diagram 400 indicating details of layer 1 and layer 2 video analysis. This is used for reservation period analysis (120 of FIG. 1). A server 401 receives video data 417 from cameras at a rental property premises, and performs layer 1 processing at 402. Layer 1 processing includes object detection and tracking. The processing can detect and track objects such as people, heads, faces, pets, cars, and any other object of interest. The output of layer 1 processing includes compressed object tracks and motion detection histograms. The output of layer 1 processing provides input to layer 2 processing 404. Layer 2 processing includes object counting and pattern determination. The counting can include objects, occurrences of movement patters such as walking through doors, walkways, safety zones, and other areas. The output of the layer 2 processing provides input to layer 3 processing 406, which is further elaborated upon in FIG. 5 and its corresponding description.

Figure 5:
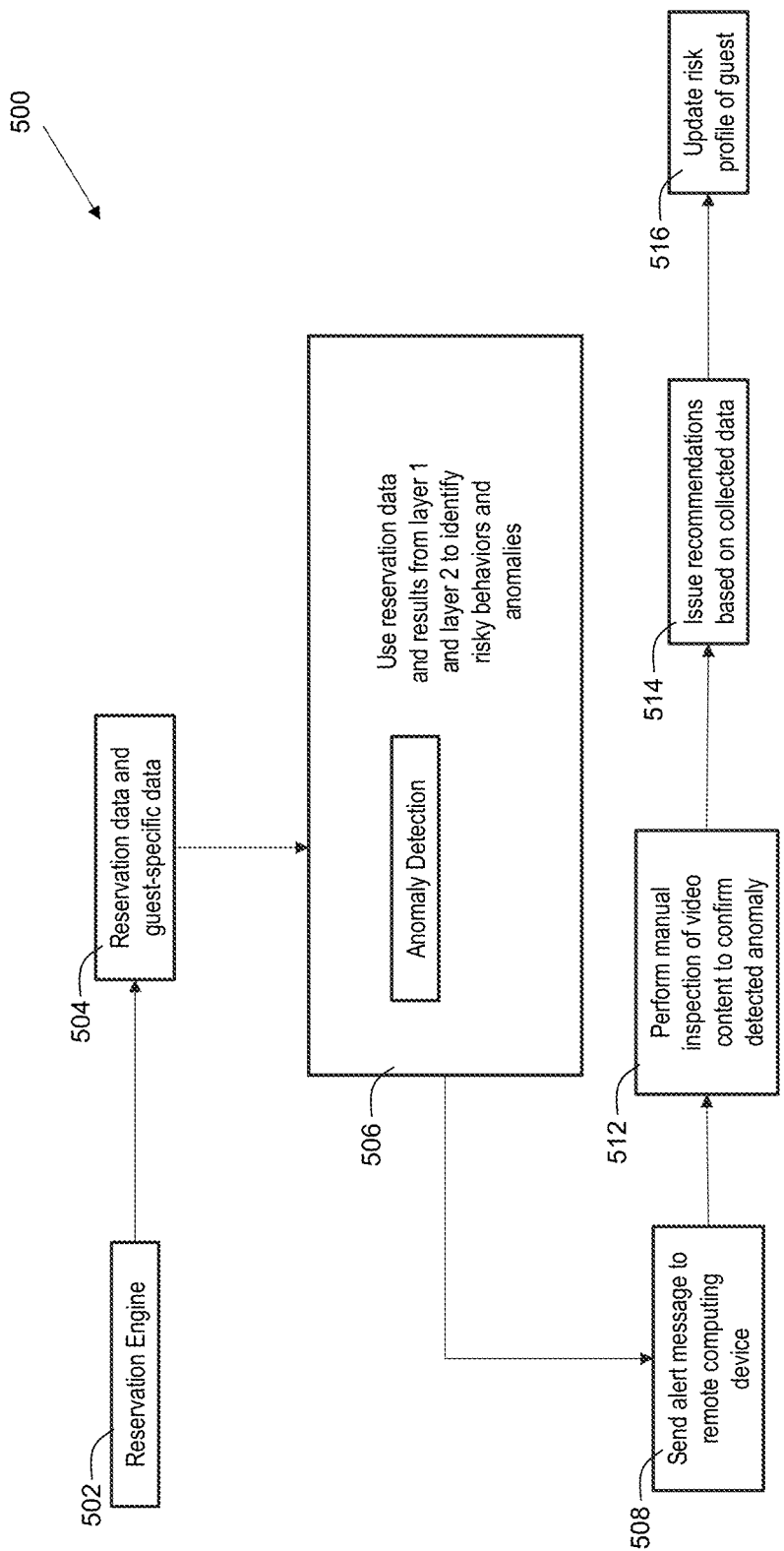
FIG. 5 is a block diagram indicating details of layer 3 video analysis.

FIG. 5 is a block diagram 500 indicating details of layer 3 video analysis. This is used for reservation period analysis (120 of FIG. 1). Input from layer 2 processing (404 of FIG. 4) is combined with reservation data and guest specific data 504 that comes from reservation engine 502. Layer 3 processing includes an anomaly detector that is powered by machine learning. In embodiments, the machine learning can include, but is not limited to, may include a neural network, convolutional neural network (CNN), Decision Trees, Random Forests, clustering, hierarchical clustering, k-means, and/or any other supervised learning techniques, unsupervised learning techniques, or a combination of both supervised and unsupervised learning techniques. In embodiments, TensorFlow or other suitable frameworks may be used in the implementation of machine learning systems used with disclosed embodiments. The output of the layer 3 video analysis can include a risk score, processed video, annotated video, audio level information, guest information, residence information, and/or other information that can be used by stakeholders to make decisions regarding the residence. In embodiments, an alert is sent to the customer support team at 508. An inspection of video content may be performed by the customer support team at 512. At 514, a recommendation is then issued based on the data (e.g., contact tenant/guest, contact security, etc. . . . ). At 516, the tenant profile of the tenant/guest is updated. In embodiments, all layers are powered by machine learning.

Figure 6:
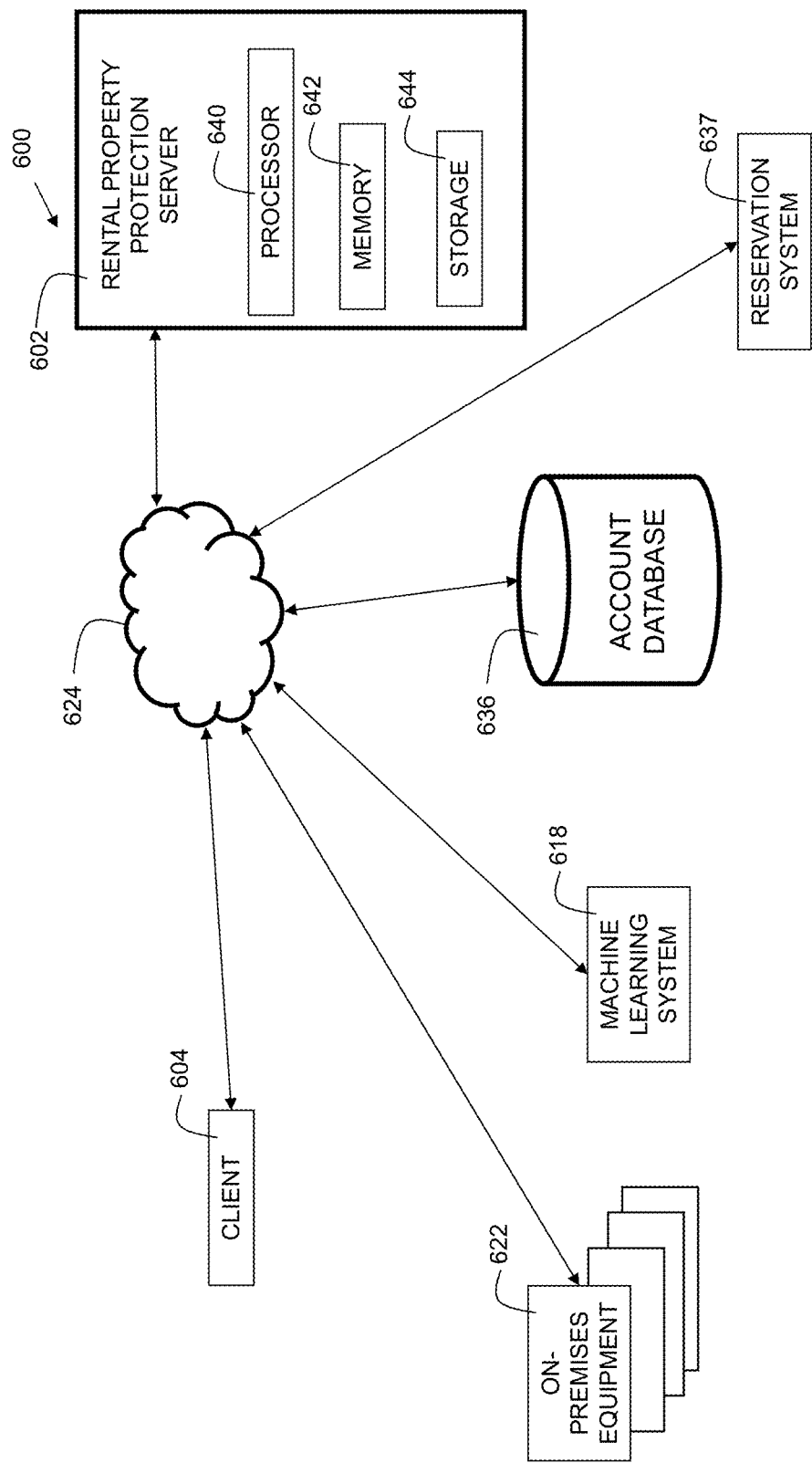
FIG. 6 is block diagram illustrating a system in accordance with embodiments of the present invention.

FIG. 6 is a block diagram of a system in accordance with embodiments of the present invention. System 600 includes a rental property protection server 602. Rental property protection server 602 is an electronic computation device. In embodiments, the rental property protection server 602 is implemented as a computer comprising a processor 640, and memory 642 coupled to the processor. The memory 642 may be a non-transitory computer readable medium. Memory 642 may include RAM, ROM, flash, EEPROM, or other suitable storage technology. The memory 642 contains instructions, that when executed by processor 640, enable communication with a variety of other devices and data stores. In embodiments, network 624 may include the Internet.

Storage 644 may include one or more magnetic hard disk drives (HDD), solid state disk drives (SSD), optical storage devices, tape drives, and/or other suitable storage devices. In embodiments, storage 644 may include multiple hard disk drives configured in a RAID (redundant array of independent disks) configuration. In embodiments, the RAID configuration can include a RAID 1 configuration in which data is copied seamlessly and simultaneously, from one disk to another, creating a replica, or mirror. If one hard disk drive becomes inoperable, another hard disk drive continues to operate, providing a level of fault tolerance for use in embodiments that utilize local storage in managed onsite or off-site servers.

In some embodiments, the rental property protection server 602 may be implemented as a virtual machine (VM), or scaled to be implemented on multiple virtual machines and/or containerized applications. In some embodiments, the virtual machines may be hosted in a cloud computing environment. In some embodiments, load balancing, and orchestration via a system such as Kubernetes, enables a scalable solution that can process video and sensor array data from multiple residences simultaneously.

A client device 604 is also connected to network 624. In embodiments, client device 604 may include, but is not limited to, a desktop computer, a laptop computer, a tablet computer, a mobile phone (e.g., smartphone), and/or other suitable electronic computing device. Note that while one client device 604 is shown in FIG. 1, in practice, multiple client devices may concurrently establish connections with rental property protection server 602 in accordance with embodiments of the present invention. In embodiments, the client device 604 can be used to interact with the rental property protection server 602, receive alerts, send messages, and/or other functionality.

The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet can be provided by Internet service providers (ISP). Users on client systems, such as client device 604 obtains access to the Internet through the Internet service providers. Access to the Internet allows users of the client computer systems to exchange information, receive and send e-mails, and view documents, such as documents which have been prepared in the HTML format. These documents are often provided by web servers which are considered to be "on" the Internet. Often these web servers are provided by the ISPs, although a computer system can be set up and connected to the Internet without that system being also an ISP as is well known in the art.

System 600 may further include an account database 636. The account database 636 may comprise multiple records, where each record includes entities such as host records, tenant records, property records, and event records. The account database 636 may be implemented as a relational database, utilizing a Structured Query Language (SQL) format, or another suitable database format. Using such a relational database, an event record represents a particular reservation of a property, and is associated with a property record, a host record, and a tenant record.

System 600 may further include a machine learning system 618. Machine learning system 618 may be used to further categorize and classify input data including data acquired from IoT sensors, image data, scenery, object recognition and/or object classification, person recognition, natural language processing (NLP), sentiment analysis, and/or other classification processes. Machine learning system 618 may include one or more neural networks, convolutional neural networks (CNNs), and/or other deep learning techniques. The machine learning system 618 may include regression algorithms, classification algorithms, clustering techniques, anomaly detection techniques, Bayesian filtering, and/or other suitable techniques to analyze the information obtained by the reservation property protection server 602 to assist in assessing threats to the property based on tenant/guest activity and/or previous booking history.

System 600 further includes on-premises equipment 622. The on-premises equipment 622 is installed at or near rental properties. The on-premises equipment can include network-enabled digital video cameras, audio sensors, temperature sensors, humidity sensors, water/moisture sensors, smoke detectors, and/or other suitable sensors. Data from the on-premises equipment 622 may be processed by machine learning system 618, and input to rental property protection server 602 via network 624. The rental property protection server 602 may maintain an occupancy count for a rental property based on people entering and exiting the residence. In response to a change in occupancy, an occupancy message may be sent to a remote computing device indicating the current occupancy. In embodiments, a maximum occupancy value for the residence is obtained (e.g., from database 636). In response to the current occupancy count exceeding the maximum occupancy value, an alert message may be sent to a remote computing device (e.g., client 604) from the rental property protection server 602. In some embodiments, the occupancy is set per reservation, such that a given residence may have different occupancy rules based on the reservation. As an example, a reservation for a holiday weekend may have a different occupancy limit than a reservation during the week. Embodiments can include obtaining the current allowed occupancy for the property, and sending an alert message to the remote computing device in response to the occupancy count exceeding the allowed value for the specific reservation.

System 600 may further include reservation system 637. The reservation system 637 may perform tasks such as listing prospective rental properties, accepting reservations, and processing payment information. In some embodiments, the rental property protection server can interface with the reservation system 637 via application programming interface (API) calls. Communication between the rental property protection server 602 and the reservation system 637 can include the use of protocols such as HTTP (HyperText Transfer Protocol), XML (Extensible Markup Language), JSON (JavaScript Object Notation), SOAP (Simple Object Access Protocol), RESTful APIs, and/or other suitable technologies. The rental property protection server 602 may include and/or utilize multiple computer systems, databases, load balancers, and other infrastructure to support analysis of data from the on-premises equipment 622.

Figure 7A:
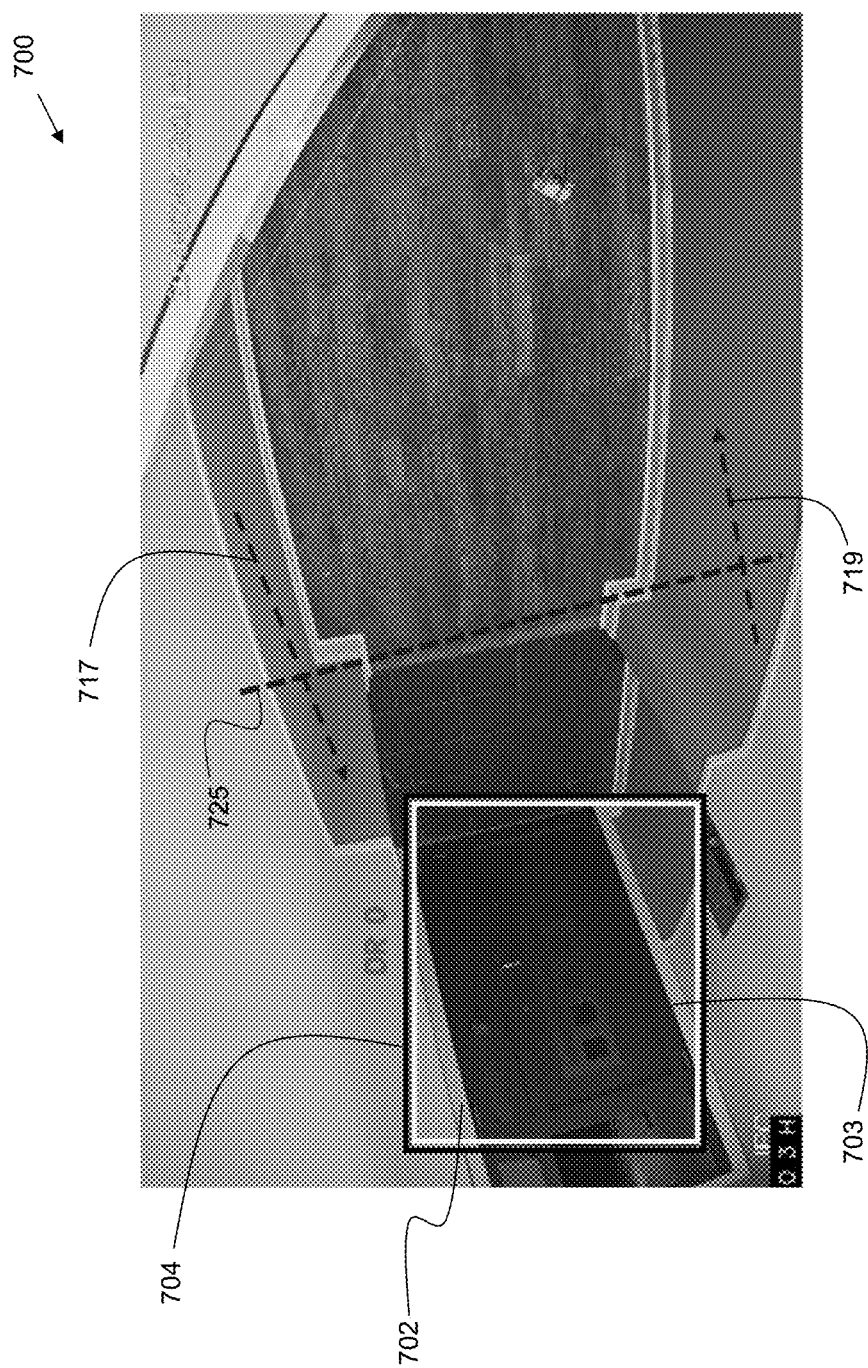
FIG. 7A is an image of a property entrance undergoing monitoring.

FIG. 7A is an image 700 from a video stream, of a property entrance undergoing monitoring. The video stream comprises a collection of temporally arranged images. A bounding box 702 may be identified by the machine learning system during an initial training process. In embodiments, the bounding box 702 is rendered around an entrance 703 to a property. A border shape or line 725 may be established via a user interface on client device 604 (FIG. 6). The border shape or line indicates a boundary within the image 700 that is closely monitored for changes within the image. This line is used as a reference for tracking people. When a person is detected to traverse the boundary of line 725 towards the entrance 703 in the direction indicated by line 717, that person is deemed to have entered the property. When a person is detected to traverse the boundary of line 725 away the entrance 703 in the direction indicated by arrow 719, that person is deemed to have exited the property. When changes occur, layers of the video processing system (360 of FIG. 3) identify and count objects, as well as determine paths/trajectories of some objects.

Figure 7B:
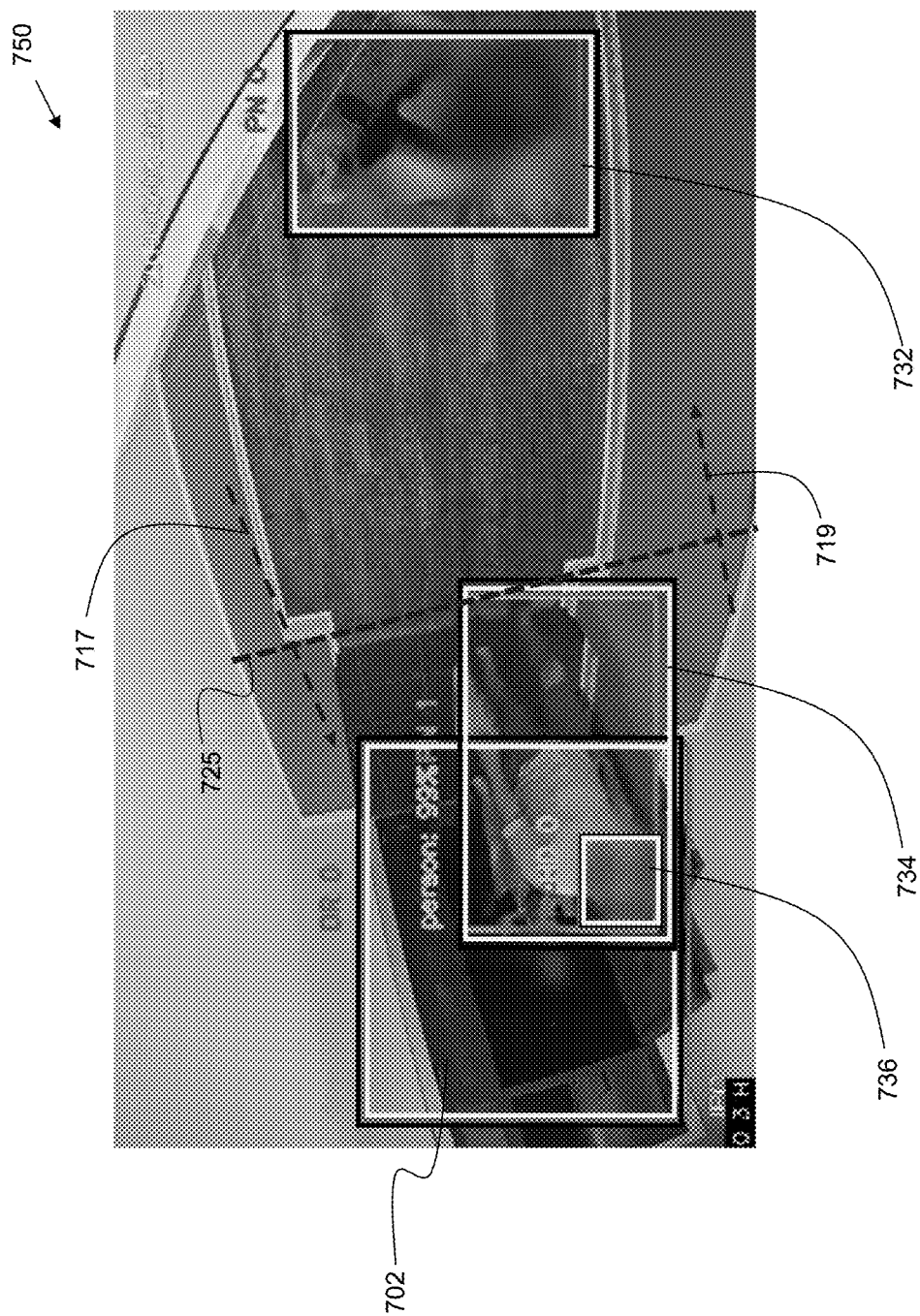
FIG. 7B is an image of the property entrance of FIG. 7B, indicating persons entering.

FIG. 7B is an image 750 of the property entrance of FIG. 7B, indicating persons entering. Bounding boxes may be rendered where objects are detected. In some embodiments, the camera may have on-board image processing to render the bounding boxes. In other embodiments, the video processing system 360 performs motion analysis and composites bounding boxes on the video frame images. Bounding box 732 represents detection of a person. Bounding box 734 represents detection of another person. Bounding box 736 represents detection of a head. In some embodiments, detected faces may be blurred by the camera and/or the video processing system 360 for purposes of privacy protection of tenants. In embodiments, an overarching goal of the systems and methods is to track how many people and things enter and exit a premises. This can be accomplished without necessarily revealing identities of the people entering and exiting the premises.

In some embodiments, maintenance and/or cleaning personnel may be identified as they enter and exit a residence. In embodiments, the maintenance and/or cleaning personnel may be identified by facial recognition. In some embodiments, images of maintenance/cleaning personnel may be stored within database 636. In some embodiments, a credential such as an access card may be used to identify a maintenance and/or cleaning staff when the credential is placed in or near a credential reader. Disclosed embodiments can monitor a cleaning status. Embodiments can update the cleaning status of the property to "cleaned" if the housekeeper left the property and spent the expected amount of time inside send an alert to a remote property manager if the housekeeper left the property earlier than expected, and declare a maintenance task complete if a maintenance person left the property. In embodiments, the machine learning system 618 is configured and disposed to identify maintenance personnel entering and exiting the rental property.

Figure 8:
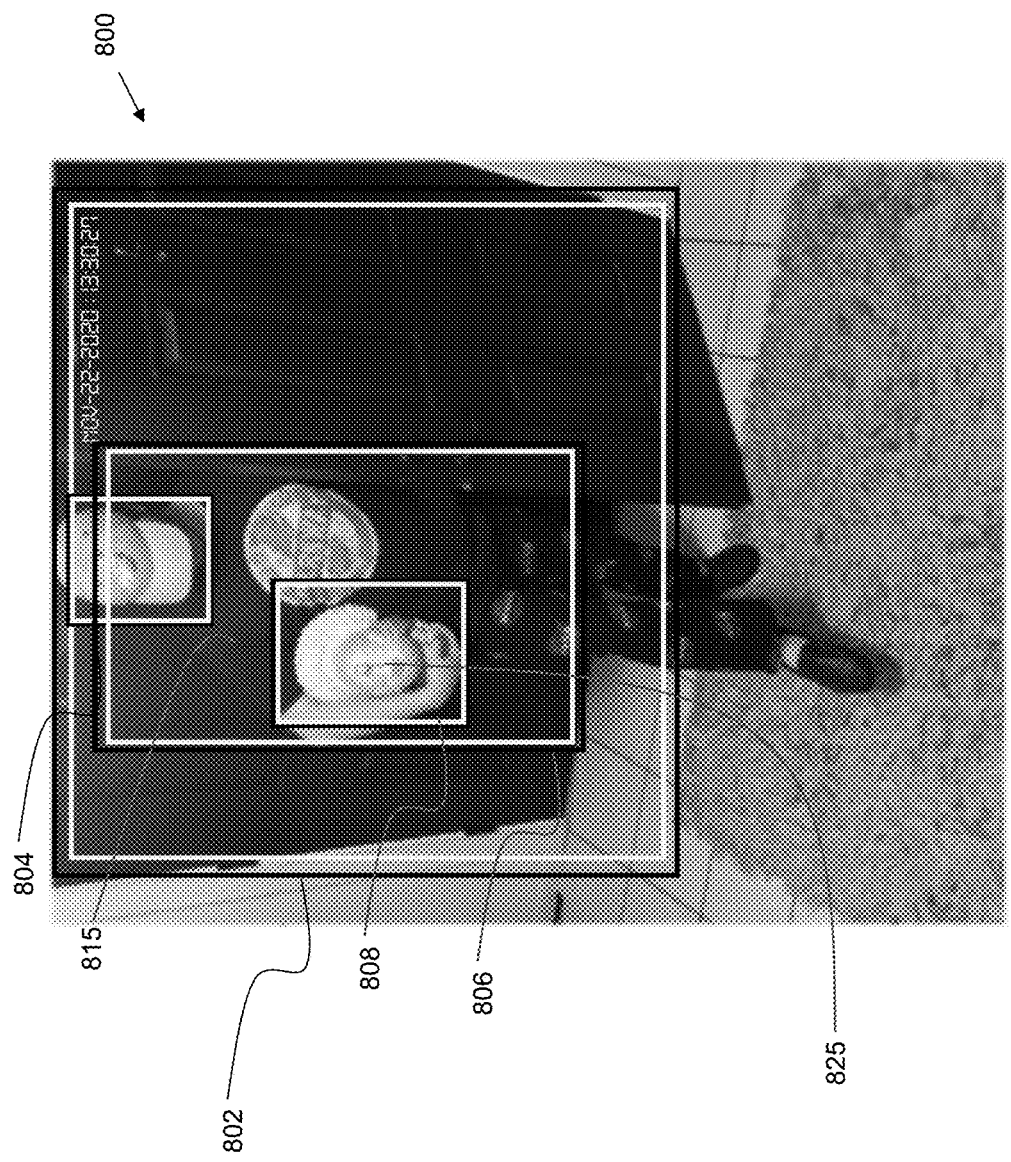
FIG. 8 is an image of a property showing a person with a prohibited object.

FIG. 8 is an image 800 from a video stream, of a property showing a person with a prohibited object. Bounding box 802 is formed around an entrance to a common hallway of a multiple dwelling unit. Bounding box 806 is formed around a person 815. Bounding box 808 is formed around an object being carried by the person. In embodiments, the object within bounding box 808 may be analyzed by machine learning system 618 and/or video processing system 360. If the object is identified with a confidence level (probability) exceeding a predetermined threshold, it may be compared against a list of prohibited objects for the rental property. As an example, the person 815 is carrying an object 825 that the machine learning system 618 and/or video processing system 360 recognizes as a turkey. In this example, the rental property has a list of prohibited items that includes animals. The machine learning system 618 may have various categories and classifications for objects. The machine learning system 618, upon identifying the object 825 as a turkey, and further classifying a turkey as a type of animal, provides the object information to the rental property protection server 602. In response, the rental property protection server 602 may take one or more actions, including contacting security personnel, property management, and/or the guest to alert them to the prohibited item. Embodiments can include identifying an object transported by the person that is entering a rental property, comparing the transported object to a list of prohibited objects for the rental property. In response to the transported object being in the list of prohibited objects, a prohibited object message is sent to a remote computing device indicating the presence of a prohibited object.

Embodiments can include using a machine learning system to identify an object of interest traversing a boundary within a field of view of a digital camera, wherein the boundary is associated with the entrance of a residence. The object of interest can be a person. The person can be a guest, maintenance worker, housekeeping person, or other person associated with a guest. The object of interest can be an item. The item can be a prohibited item as defined by rules of the residence and/or terms of the reservation.

Figure 9:
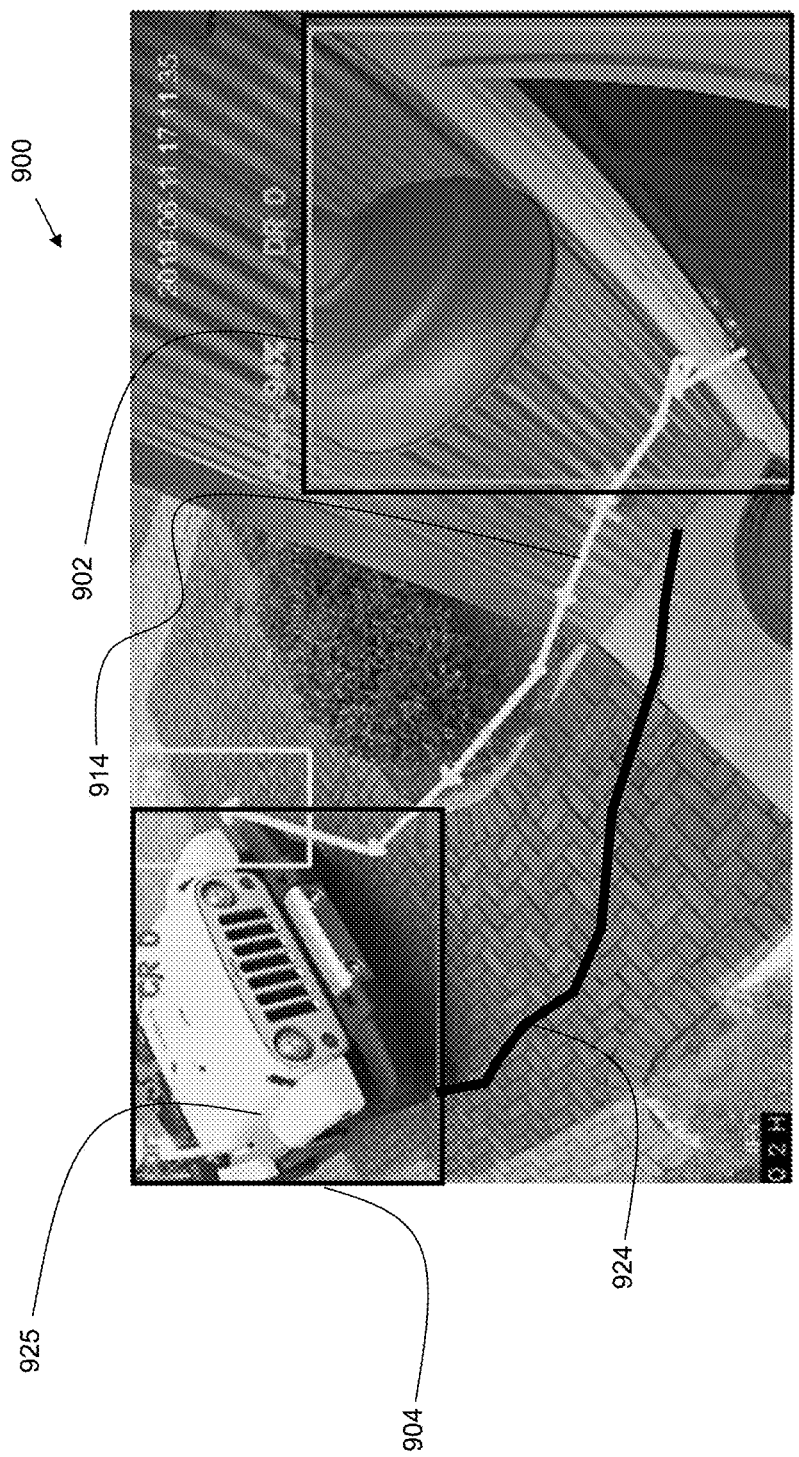
FIG. 9 is an image of a property entrance showing pedestrian compressed object tracks.

FIG. 9 is an image 900 from a video stream, of a property entrance showing compressed object tracks. Bounding box 902 is formed around an entrance to a residence. Bounding box 904 is formed around an automobile. Compressed object track 914 indicates a path of a first person. Compressed object track 924 indicates a path of a second person. The tracks 914 and 924 indicate that two people left the residence and likely entered the automobile 925. The tracks can be useful for determining the flow, behavior, mood and actions of people in and out of a residence. In embodiments, the machine learning system 618 is configured and disposed to identify behavior, aggression and characteristics of one or more people in the field of view of the digital camera by analyzing the compressed object tracks of the people. In embodiments, object tracks that are rapid and/or changing directions frequently may be associated with aggression. In contrast, object tracks that are slow and/or maintaining one direction may be associated with calmness.

Figure 10:
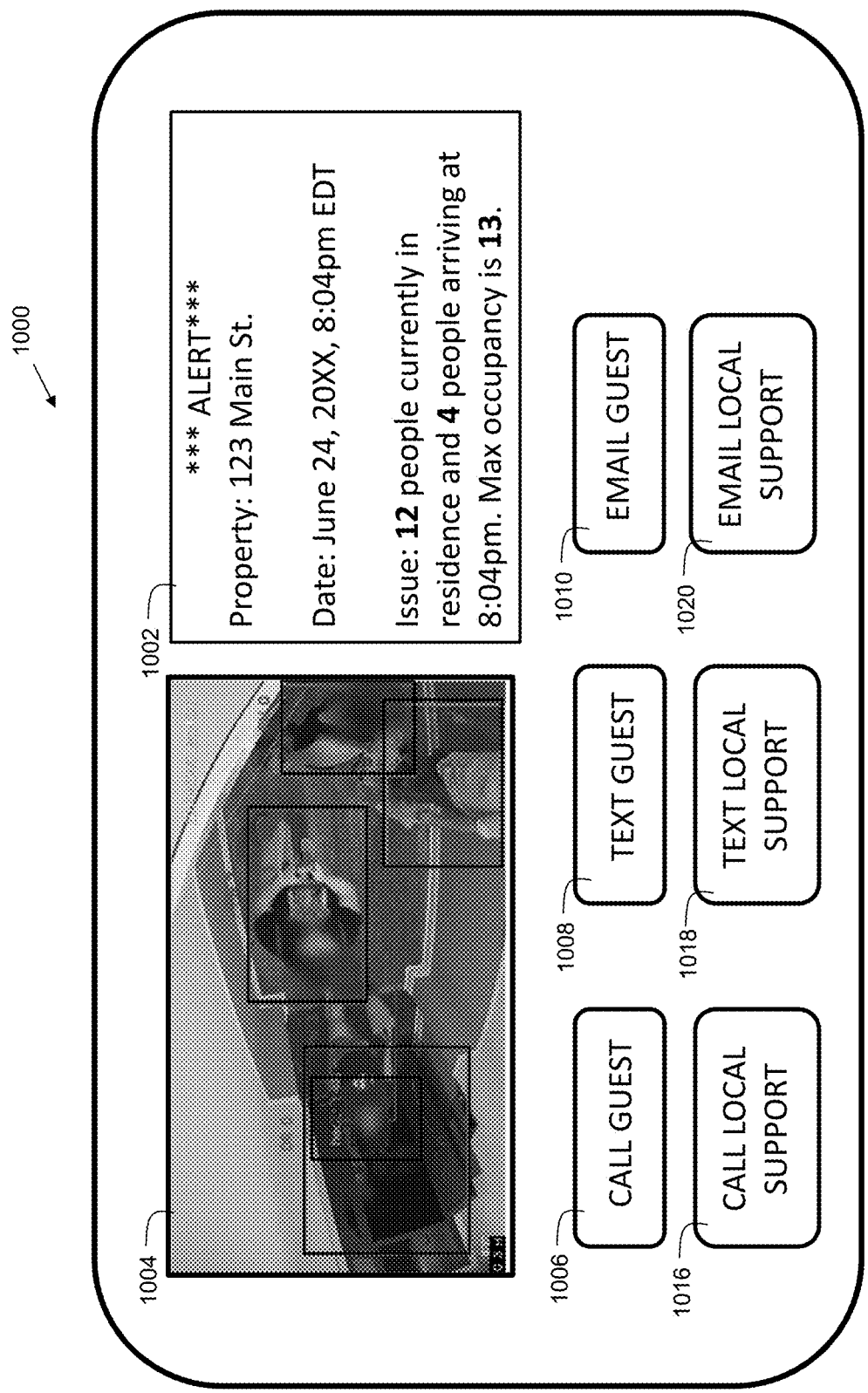
FIG. 10 is an exemplary alert user interface in accordance with embodiments of the present invention.

FIG. 10 is an exemplary alert user interface 1000 in accordance with embodiments of the present invention. User interface 1000 may be implemented on a touchscreen of a client device such as client device 604 of FIG. 6. The user interface 1000 may include a video image 1004. The video image 1004 may be a live stream, a prerecorded stream, or a still image from one or more cameras at or near the rental property. The user interface may include an alert field 1002. The alert field 1002 may include alert information such as a property address/location, a date and time, and additional details about the alert. In the example, the alert field 1002 displays an occupancy alert message which indicates that an estimated twelve people are currently in the residence and four more people are arriving. If the reservation has less than 16 confirmed guests, then an alert may be generated in alert field 1002.

The user interface 1000 may optionally include one or more buttons (or other suitable controls) for contacting one or more stakeholders. Button 1006 places a voice call to the guest based on contact information provided by the guest. Button 1008 opens a text window for composing a text to be sent to a mobile device (e.g., telephone) associated with the guest. Button 1010 opens an e-mail application for composing an e-mail to be sent to a mobile device (e.g., telephone) associated with the guest. Button 1016 places a voice call to the local support (e.g., on-site security, maintenance, property management, etc.). Button 1008 opens a text window for composing a text to be sent to the local support. Button 1010 opens an e-mail application for composing an e-mail to be sent to the local support.

Figure 11:
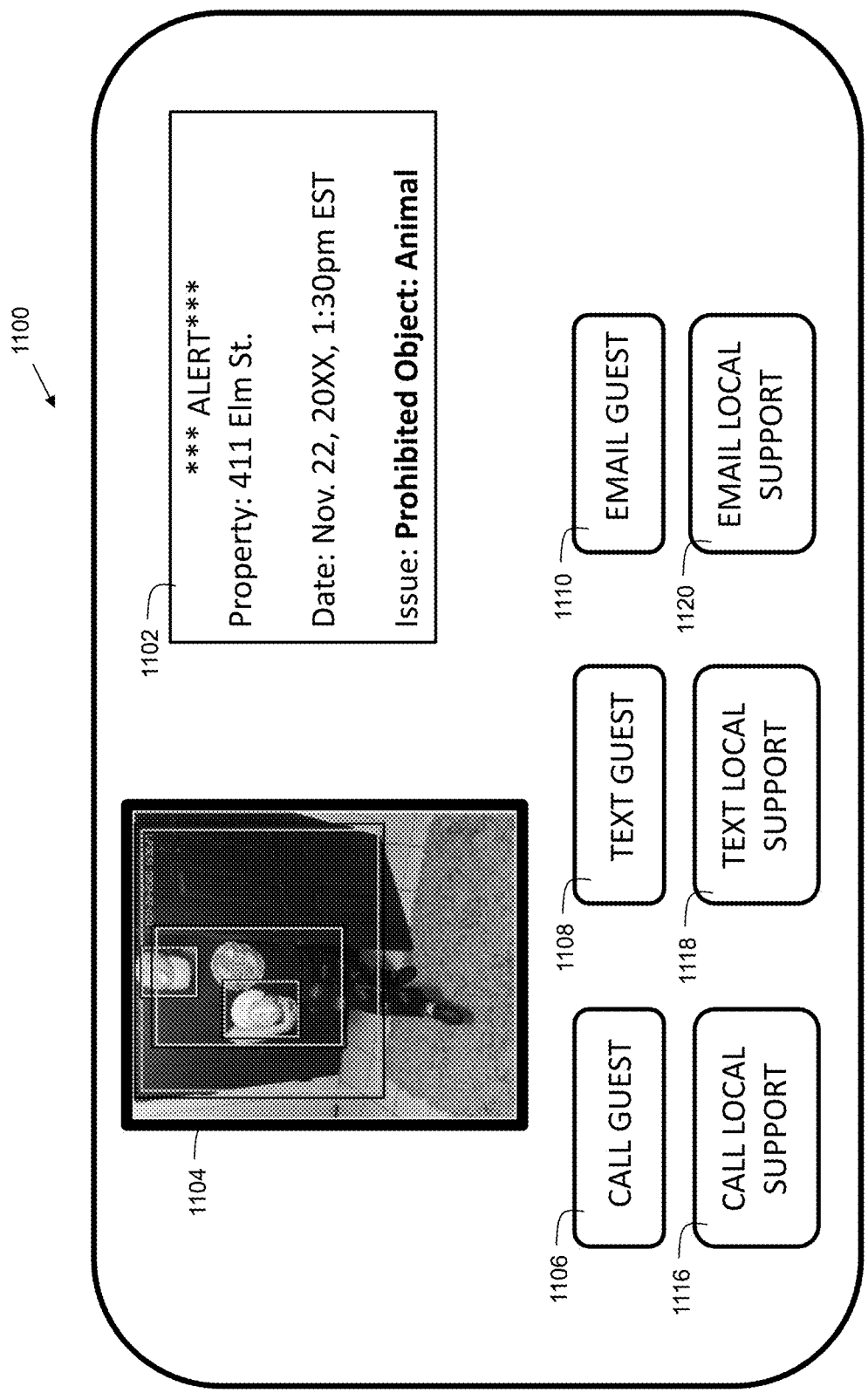
FIG. 11 is another exemplary alert user interface in accordance with embodiments of the present invention.

FIG. 11 is another exemplary alert user interface 1100 in accordance with embodiments of the present invention. User interface 1100 may be implemented on a touchscreen of a client device such as client device 604 of FIG. 6. The user interface 1100 may include a video image 1104. The video image 1104 may be a live stream, a prerecorded stream, or a still image from one or more cameras at or near the rental property. The user interface may include an alert field 1102. The alert field 1102 may include alert information such as a property address/location, a date and time, and additional details about the alert. In the example, the alert field 1102 displays a prohibited object message. In the example, the video image 1104 indicates a person carrying an animal. (see 825 of FIG. 8). The animal may be identified as such based on machine-learning based classification from machine learning system 618. In embodiments, in response to receiving an indication of an animal, the rental property protection server 602 retrieves a record from database 636 including a list of prohibited times. If the rental property has a no-animal policy, then an alert such as shown at 1102 may be displayed. In some embodiments, certain types of animals may be allowed, whereas others may not. As an example, a rental property may have a policy that dogs are allowed, while cats are prohibited. The machine learning system 618 may discern with a sufficient confidence, that an animal is a cat. In that example, in response to specifically detecting a cat, an alert similar to shown in alert field 1102 may be generated, while for a dog, such an alert might not be generated. Thus embodiments, may provide prohibited object alert messages based on a specific animal type. Other embodiments may further discern prohibited objects based on size. As an example, a rental property may have a policy that dogs under 25 pounds are allowed, while dogs over 25 pounds are not allowed. In some embodiments, the machine learning system 618 may infer a weight of a dog based on size. The machine learning system 618 can be trained with images of various sized dogs, and accompanying metadata that includes the weight of the dog. In embodiments, the weight of the dog may be inferred from the size of the dog. Thus embodiments, may provide prohibited object alert messages based on both a specific animal type and animal size. Other embodiments may further discern prohibited objects based on an animal subtype. As an example, a rental property may have a policy that in general, dogs are allowed, with the exception of the pit bull breed of dogs. In some embodiments, the machine learning system 618 may infer breed of a dog. The machine learning system 618 can be trained with images of various breeds of dogs. In embodiments, the weight of the dog may be inferred from the size of the dog. Thus embodiments, may provide prohibited object alert messages based on both a specific animal type and animal subtype. In the aforementioned example, the animal type is "dog" and the animal subtype is "pit bull.".

Similar to the user interface 1000 of FIG. 10, user interface 1100 may optionally include one or more buttons (or other suitable controls) for contacting one or more stakeholders. Button 1106 places a voice call to the guest based on contact information provided by the guest. Button 1108 opens a text window for composing a text to be sent to a mobile device (e.g., telephone) associated with the guest. Button 1110 opens an e-mail application for composing an e-mail to be sent to a mobile device (e.g., telephone) associated with the guest. Button 1116 places a voice call to the local support (e.g., on-site security, maintenance, property management, etc.). Button 1108 opens a text window for composing a text to be sent to the local support. Button 1110 opens an e-mail application for composing an e-mail to be sent to the local support.

Figure 12:
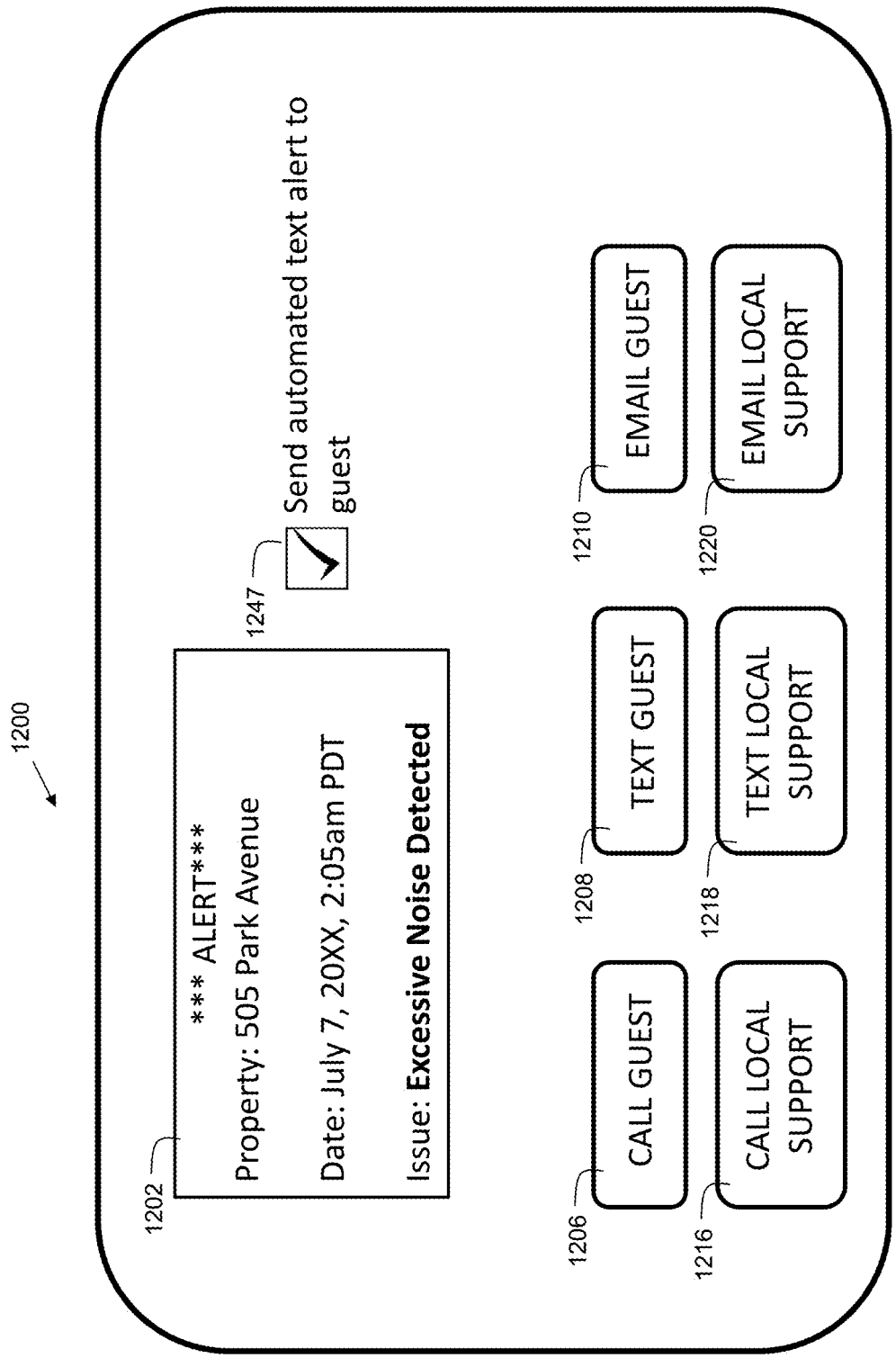
FIG. 12 is yet another exemplary alert user interface in accordance with embodiments of the present invention.

FIG. 12 is another exemplary alert user interface 1200 in accordance with embodiments of the present invention. User interface 1200 may be implemented on a touchscreen of a client device such as client device 604 of FIG. 6. The user interface 1200 may include an alert field 1202. The alert field 1202 may include alert information such as a property address/location, a date and time, and additional details about the alert. In the example, the alert is an excessive noise detected message. In embodiments, audio data from an audio sensor (e.g., 322 of FIG. 3) may be obtained by the rental property protection server 602. In embodiments, the audio data includes a sound level value, but does not include any audio samples from within the rental property. In this way, excessive noise can be monitored without adversely affecting the privacy of guests, as the sound level value does not include any speech or other sounds from the interior of the rental property. It is only an indication of how loud sounds within the interior of the rental property are. In some embodiments, audio sensors may also be in an exterior location of the rental property, such as in a back yard near a patio, for example. In embodiments, the sound level value may be in decibels, or other nominal units. If the received sound level exceeds a predetermined threshold, then an alert such as shown at 1202 may be displayed.

Similar to the user interface 1000 of FIG. 10, user interface 1200 may optionally include one or more buttons (or other suitable controls) for contacting one or more stakeholders. Button 1206 places a voice call to the guest based on contact information provided by the guest. Button 1208 opens a text window for composing a text to be sent to a mobile device (e.g., telephone) associated with the guest. Button 1210 opens an e-mail application for composing an e-mail to be sent to a mobile device (e.g., telephone) associated with the guest. Button 1116 places a voice call to the local support (e.g., on-site security, maintenance, property management, etc.). Button 1108 opens a text window for composing a text to be sent to the local support. Button 1210 opens an e-mail application for composing an e-mail to be sent to the local support.

In this embodiment, an additional option is shown at 1247 to send an automated excessive noise warning message as a text message to a mobile device (e.g., telephone) associated with the guest in response to receiving an excessive noise detected message. In some embodiments, the rental property protection server 602 may be configured to send an automated text alert to the guest in response to receiving a first excessive noise detected message. Then, if a subsequent excessive noise detected message is received, an escalation protocol may be performed, such as notifying local support. In this way, a first level of guest notification may be performed in an automated manner, without any human intervention. In many situations, the receipt of the automated text alert causes the guest to reduce noise, thereby eliminating the need for property personnel to get involved. Below is an example of an automated excessive noise warning message that may be sent to a mobile device associated with the guest(s) at the property.

Dear First_name, we are receiving reports of excessive noise from the property. Please note that we have a policy against excessive noise. Please reduce the noise level as a courtesy to other guests. Thank you for your cooperation and understanding in this matter.

Figure 13:
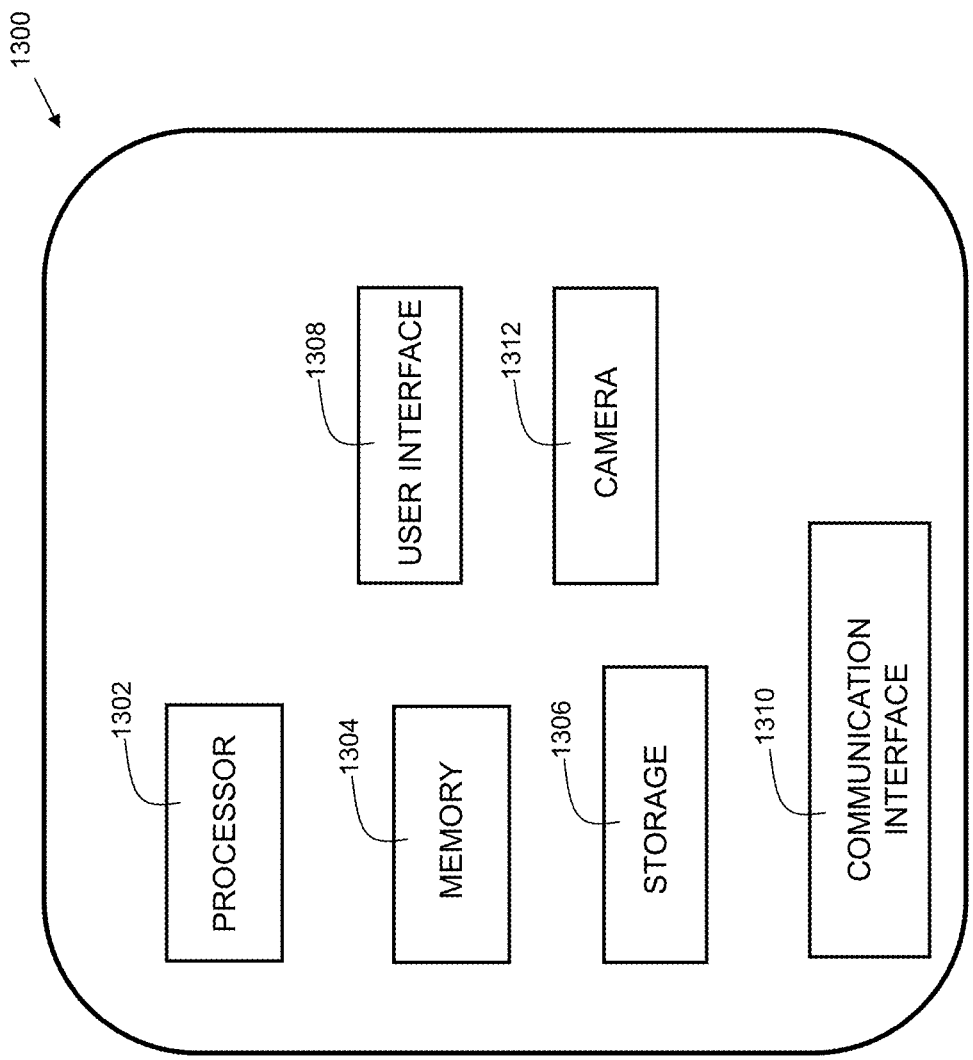
FIG. 13 is a block diagram of a client device in accordance with embodiments of the present invention.

FIG. 13 is a block diagram of a client device 1300 in accordance with embodiments of the present invention. In embodiments, client device 1300 is an electronic device that may include a desktop computer, laptop computer, tablet computer, smartphone, and/or other suitable client device. Client device 1300 may be similar to client device 604 as shown in FIG. 6. Client device 1300 includes a processor 1302, a memory 1304 coupled to the processor 1302, and storage 1306. The memory 1304 may be a non-transitory computer readable medium. Memory 1304 may include RAM, ROM, flash, EEPROM, or other suitable storage technology. The memory 1304 contains instructions, that when executed by processor 1302, enable communication to/from rental property protection server 602 of FIG. 6. Client device 1300 further includes a network communication interface 1310 for performing this communication. In embodiments, network communication interface 1310 includes a wireless communications interface such as a cellular data interface and/or a Wi-Fi interface. In embodiments, the storage 1306 includes flash, SRAM, one or more hard disk drives (HDDs) and/or solid-state disk drives (SDDs).

Device 1300 may further include a user interface 1308. User interface 1308 may include a keyboard, monitor, mouse, and/or touchscreen, and provides a user with the ability to enter information as necessary to utilize embodiments of the present invention. In embodiments, a user uses the device 1300 to access a trained neural network within the rental property protection server 602 of FIG. 6. Device 1300 further includes a camera 1312. The camera 1312 may record both video and audio, and may be used to enable voice, video, and or text/written communication between tenants, local support, and/or other parties in response to alerts from rental property protection server 602.

As can now be appreciated, disclosed embodiments provide rental property monitoring and protection that is powered by artificial intelligence. Property managers currently use large onsite teams to monitor guests and operations. These teams are expensive, mostly inefficient, and hard to integrate into a centralized system. To tackle this, disclosed embodiments utilize a computer vision artificial intelligence (AI) that captures operations insights from security camera footage, eliminating the need for local crews at the property. The AI can integrate with on-premises sensors that follow noise and smoke levels and tag potentially costly guest and maintenance issues.

Thus, disclosed embodiments enable remote hospitality management by extracting real-time operations data from video. Disclosed embodiments can act as a virtual reception desk that monitors individual units in real-time. Disclosed embodiments can capture information about guest actions and needs, determine that guests comply with house rules, and monitors cleaning and maintenance.

Disclosed embodiments include a machine learning algorithm. It extracts actionable data about people count, movement, mood, needs, behavior and carried objects from security video. The same algorithm analyses multiple data points about our guests, including our written communication with them, to establish their risk profile and recommends preventive or proactive actions whenever needed.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A computer-implemented method for monitoring and protecting a rental property, comprising:
   acquiring video data of an entrance for the rental property from a digital camera;
   establishing a boundary within a field of view of the digital camera, wherein the boundary is associated with the entrance;
   using a machine learning system to identify an object of interest that is being brought by a person traversing the boundary, wherein identifying the object of interest comprises:

establishing a bounding box around the object of interest based on motion analysis; and computing a confidence level for the object of interest based on image data within the bounding box;

in response to the confidence level exceeding a predetermined threshold, obtaining object information for the object, wherein the object information includes an object type and a category for the object of interest;

comparing the object information for the identified object to a list of prohibited objects for the rental property;

sending a prohibited object message to a remote computing device in response to the object information being in the list of prohibited objects;

in response to identifying the object of interest traversing the boundary, updating an occupancy count for the rental property; and sending an occupancy message to the remote computing device, wherein the occupancy message includes the updated occupancy count.

2. The method of claim 1, wherein the updating includes incrementing the occupancy count in response to detecting the person traversing the boundary towards the entrance.

3. The method of claim 2, wherein the updating includes incrementing the occupancy count in response to detecting the person traversing the boundary away from the entrance.

4. The method of claim 1, further comprising:
obtaining a maximum occupancy value for a specific reservation for the rental property, and
sending an alert message to the remote computing device in response to the occupancy count exceeding the maximum occupancy value.

5. The method of claim 4, further comprising:
obtaining booking criteria; and
performing a prebooking information request in response to the booking criteria.

6. The method of claim 5, wherein the booking criteria includes a rental property distance value below a predetermined distance.

7. The method of claim 5, wherein the booking criteria includes a difference between a maximum occupancy value the specific reservation and a current number of people in the property.

8. The method of claim 1, further comprising:
acquiring a sound level for the rental property;
in response to the sound level exceeding a predetermined threshold, sending an automated message to a remote computing device.

9. The method of claim 8, wherein the sound level is acquired from an interior location within the rental property.

10. The method of claim 8, wherein the sound level is acquired from an exterior location within the rental property.

11. The method of claim 1, further comprising acquiring audio data of the entrance from the digital camera.

12. The method of claim 1, wherein the machine learning system is configured and disposed to identify behavior, aggression and characteristics of one or more people in the field of view of the digital camera by analyzing compressed object tracks of the people.

13. The method of claim 1, wherein the machine learning system is configured and disposed to identify maintenance personnel entering and exiting the rental property.

14. An electronic computation device comprising:
a processor;
a memory coupled to the processor, the memory containing instructions, that when executed by the processor, cause the electronic computation device to:
acquire video data of an entrance for a rental property from a digital camera;
use a machine learning system to establish a boundary within a field of view of the digital camera, wherein the boundary is associated with the entrance;
use the machine learning system to identify an object of interest that is being brought by a person traversing the boundary, wherein identifying the object of interest is accomplished by instructions that cause the electronic computation device to:
establish a bounding box around the object of interest based on motion analysis; and
compute a confidence level for the object of interest based on image data within the bounding box;
in response to the confidence level exceeding a predetermined threshold, obtain object information for the object, wherein the object information includes an object type and a category for the object of interest;
compare the object information for the identified object to a list of prohibited objects for the rental property;
send a prohibited object message to a remote computing device in response to the object information being in the list of prohibited objects;
in response to identifying the person traversing the boundary, updating an occupancy count for the rental property; and
send an occupancy message to the remote computing device, wherein the occupancy message includes the updated occupancy count.

15. The electronic computation device of claim 14, wherein the memory further includes instructions, that when executed by the processor, cause the electronic computation device to increment the occupancy count in response to detecting the person traversing the boundary towards the entrance.

16. The electronic computation device of claim 14, wherein the memory further includes instructions, that when executed by the processor, cause the electronic computation device to:
obtain a maximum occupancy value for the rental property, and
send an occupancy alert message to the remote computing device in response to the occupancy count exceeding the maximum occupancy value.

17. The electronic computation device of claim 14, wherein the memory further includes instructions, that when executed by the processor, cause the electronic computation device to:
acquire a sound level for the rental property;
send an automated excessive noise warning message to a remote computing device in response to the sound level exceeding a predetermined threshold.

18. A computer program product for an electronic computation device comprising a computer readable storage medium having program instructions embodied therewith, the program instructions executable by a processor to cause the electronic computation device to:
acquire video data of an entrance for a rental property from a digital camera;
use a machine learning system to establish a boundary within a field of view of the digital camera, wherein the boundary is associated with the entrance;
use the machine learning system to identify an object of interest that is being brought by a person traversing the boundary, wherein identifying the object of interest is accomplished by instructions that cause the electronic computation device to:
    establish a bounding box around the object of interest based on motion analysis; and
    compute a confidence level for the object of interest based on image data within the bounding box;
in response to the confidence level exceeding a predetermined threshold, obtain object information for the object, wherein the object information includes an object type and a category for the object of interest;
compare the object information for the identified object to a list of prohibited objects for the rental property;
send a prohibited object message to a remote computing device in response to the object information being in the list of prohibited objects;
in response to identifying the person traversing the boundary, updating an occupancy count for the rental property; and
send an occupancy message to the remote computing device, wherein the occupancy message includes the updated occupancy count.

* * * * *